United States Patent [19]

Vis et al.

[11] 4,328,112

[45] May 4, 1982

[54] PROCESS FOR THE PREPARATION OF SULFUR-CONTAINING ADDITIVES FOR LUBRICANT COMPOSITIONS

[75] Inventors: Jan Vis, Zevenaar; Willem J. de Klein, Dieren, both of Netherlands

[73] Assignee: Akzona Incorporated, Asheville, N.C.

[21] Appl. No.: 226,277

[22] Filed: Jan. 19, 1981

[30] Foreign Application Priority Data

Jan. 21, 1980 [NL] Netherlands ..................... 8000362

[51] Int. Cl.$^3$ ..................... C10M 1/38; C07G 17/00
[52] U.S. Cl. .................................. 252/47.5; 260/125; 252/48.6
[58] Field of Search ............. 260/125, 132; 252/47.5, 252/48.6

[56] References Cited

U.S. PATENT DOCUMENTS

| | | | |
|---|---|---|---|
| 2,855,366 | 10/1958 | Manteuffel et al. | 252/48.6 X |
| 3,919,187 | 11/1975 | Bourdoncle et al. | 252/48.6 X |
| 4,014,910 | 3/1977 | de Klein | 260/413 R |
| 4,119,550 | 10/1978 | Davis et al. | 252/48.6 X |
| 4,177,153 | 12/1979 | Lowe | 252/47.5 X |
| 4,201,684 | 5/1980 | Malec | 252/48.6 X |

FOREIGN PATENT DOCUMENTS

| | | | |
|---|---|---|---|
| 448019 | 4/1948 | Canada | 252/48.6 |
| 480418 | 1/1952 | Canada | 260/125 |

*Primary Examiner*—Thomas A. Waltz
*Attorney, Agent, or Firm*—Francis W. Young; Robert F. Green

[57] ABSTRACT

An improved process for preparing a sulfur-containing composition useful as a lubricant additive wherein an organic carboxylic acid is sulfurized in the form of the acid or an ester or amide derivative thereof is disclosed. The improvement comprises using as the acid or acid portion of an ester or amide derivative, a carboxylic acid or mixture thereof obtained by telomerizing an ethylenically unsaturated compound under inert conditions in a reaction medium containing from about $10^{-3}$ to about $10^{-10}$ moles per liter of an at least trivalent manganese compound and one or more carbonyl compounds having at least one hydrogen atom on an alpha-carbon atom wherein at least 60 percent by weight of the total carbonyl-containing compound content is present as carboxylic anhydride and the molar ratio of the reacted quantity of ethylenically unsaturated compounds to the at least trivalent manganese compound is at least 4.

8 Claims, No Drawings

PROCESS FOR THE PREPARATION OF SULFUR-CONTAINING ADDITIVES FOR LUBRICANT COMPOSITIONS

BACKGROUND OF THE INVENTION

This invention relates to a process for preparing sulfur-containing compositions useful as additives for lubricant formulations.

Methods for the preparation of sulfur-containing additives for lubricants are, among others, described in U.S. Pat. No. 2,855,366, wherein an organic acid and/or ester is treated with sulfur, sulfur chloride, hydrogen sulfide, phosphorus pentasulfide and/or phosphorus sesquisulfide, at elevated temperatures. In said patent it is stated that, when one begins with natural oils and fats, sulfurizing will in many cases lead to products with a viscosity that is frequently much too high for the mentioned purpose, and to a solubility in mineral oils which is too limited. The disclosure of the patent thus suggests that one perform the sulfurization of the mentioned naturally occurring esters in the presence of a fatty acid, oleic acid.

The present invention provides an improved process for the preparation of sulfur-containing compositions useful as additives to lubricant compositions with even better viscosity behavior and greatly increased solubility in mineral oil fractions.

SUMMARY OF THE INVENTION

The present invention provides an improved process for preparing a sulfur-containing composition useful as a lubricant additive wherein an organic carboxylic acid is sulfurized in the form of the acid or an ester or amide derivative thereof. The improvement comprises using as the acid or acid portion of an ester or amide derivative, a carboxylic acid or mixture thereof obtained by telomerizing an ethylenically unsaturated compound under inert conditions in a reaction medium containing from about $10^{-3}$ to about $10^{-10}$ moles per liter of an at least trivalent manganese compound and one or more carbonyl compounds having at least one hydrogen atom on an alpha-carbon atom wherein at least 60 percent by weight of the total carbonyl-containing compound content is present as carboxylic anhydride and the molar ratio of the reacted quantity of ethylenically unsaturated compounds to the at least trivalent manganese compound is at least 4.

A big advantage of the process pursuant to the present invention is the fact that one begins with completely synthetic initial materials, which on the one hand makes possible a greater flexibility in the execution of the process, and on the other hand assures a constant quality.

DETAILED DESCRIPTION OF THE PREFERRED EMBODIMENTS

Among the carbonyl compounds which are useful in the execution of the process pursuant to the present invention are the anhydrides of the following acids: acetic acid, propionic acid, octanoic acid, phenyl-propionic acid, stearic acid, etc. It is understood, that the acids may also carry substituents, provided the criterion is met, that the carbon atom located in the alpha position with respect to the carbonyl radical contains at least one hydrogen atom.

For practical reasons, preference is given to the anhydrides of the lower fatty acids, such as acetic acid and isobutyric acid, since those anhydrides can easily be removed from the reaction mixture by means of distillation. The telomerization method for the preparation of the organic monocarboxylic acids can be carried out in several ways. Preference is given to adding the at least trivalent manganese compound gradually to the reaction mixture. During the addition, the formed carboxylic acid separates in the form of an anhydride without the formation of large quantities of undesirable by-products due to side reactions. By mixing the reaction mixture well, it is, notwithstanding the low concentration of the manganese compound, in view of the high speed at which the reaction is taking place, possible to obtain a high degree of conversion per unit of volume of the reactor. The concentration of the ethylenically unsaturated compound should be chosen in such a way, that the molar ratio of the reacted quantity of ethylenically unsaturated compounds to the mentioned trivalent manganese compound is at least 4. Under certain circumstances, a two-phase system is thus formed. The concentration of the ethylenically unsaturated compound in the reaction medium may thereby vary from 0.005 to 0.5 mol per liter.

Usually, one proceeds in such a way, that a part of the ethylenically unsaturated compound is put in the reaction mixture up to a concentration between 0.1 and 0.5 mol per liter, while the remaining quantity is gradually added to the reaction mixture together with the manganese compound.

In order to counteract as much as possible the formation of by-products, it is best to use a manganese III concentration that is as low as possible. It is an important additional advantage of the method pursuant to the present invention, that more than 95% of divalent manganese compounds formed during the reaction can easily be removed by simple filtration.

The temperature range within which the reaction will still proceed with reasonable speed is between about 50° and about 250° C. An attractive version of the method pursuant to the present invention consists of the presence of at least 90% of the carbonyl compound in the form of acetic anhydride, and that use is made of manganese III acetate as the initiator at a temperature between about 100° and about 140° C.

Among the ethylenically unsaturated compounds which may be used in the preparation of the carboxylic acids are aliphatic, as well as cycloaromatic hydrocarbons with c=c bonds. They may carry substituents, such as a halogen atom, e.g. chlorine or bromine; a cyano group; an alkoxy or methylene alkoxy group; an acetoxy or a methylene acetoxy group; or aryl groups, either substituted, or unsubstituted with the substituents previously indicated.

Among others, examples of suitable initial materials are olefins with 2–42 carbon atoms, such as ethylene, propylene, 1-butene, 3-methyl butene-1, 1-hexene, 1-octene, 1-dodecene, 2-dodecene, 1-hexadecene and 1-octadecene; cyclohexene, cyclooctene; allyl benzene. Several ethylenically unsaturated groups per molecule may also be present, such as in cyclohexadiene.

Preference is given to α-olefins with 6 to 26 carbon atoms in combination with acetic anhydride as the acid anhydride. Under those conditions, the molar ratio of olefin to manganese-III acetate is preferably selected between 4 and 10. Under the last-mentioned conditions one obtains a mixture of linear and branched acids, which is suitable for sulfurization to very valuable additives for lubricant compositions.

It has been found that generally favorable results are obtained when sulfurizing is carried out in the presence of sulfur. Furthermore, such a method is technologically especially easy to execute. An attractive method consists of reacting a quantity of organic acid, ester or amide with molten sulfur, while passing through a weak stream of nitrogen during about 2.5 hours at a temperature of 180° C. When there is no longer any $H_2S$ in the waste gas, the temperature is allowed to drop to about 80° C., whereupon a vacuum is applied for one more hour at that temperature in order to complete the removal of volatile sulfur compounds.

A variant of the foregoing method consists of heating a quantity of acid, ester or amide with sulfur to about 195° C., while nitrogen is passed through. After all the sulfur has been added, the temperature is held at that level for a number of hours (e.g. 5 hours). Subsequently, the temperature is lowered to 150° C. and air is blown through during 12 hours. The percentage by weight of sulfur introduced in this manner into the compounds may vary from 1 to 20, depending upon the type of initial material and the quantity of sulfur in the reaction medium. Additives containing such quantities of sulfur are especially suited for use in lubricating oils, greases, as well as cutting oils.

Products with generally favorable physical characteristics are obtained when, in the sulfurizing reaction, one begins with esters derived from an acid prepared in the manner indicated above, and one or more members of the group consisting of phenols, aromatic alcohols, aliphatic alcohols with 1 to about 50 carbon atoms and 1 to about 10 primary or secondary hydroxyl groups, cycloaliphatic alcohols with about 6 to about 20 carbon atoms, polyalkylene oxide glycols with 2 to about 50 alkylene oxide units having a carbon to oxygen ratio from 2.0 to about 4.3.

Usable phenols from which the esters may be derived include phenol, cresol, xylenol, mesitol, durenol, thymol, naphthol, resorcinol, hydroquinone, bisphenols such as 4,4'-oxydiphenol, 4,4'-isopropylidene diphenol, 4,4'methylene diphenol and biphenyl-4,4'-diol. They may be substituted with groups such as alkyl or alkoxy, or halogen.

Suitable aromatic alcohols include benzyl alcohol, tolyl alcohol (=methyl-phenyl carbinol), phenetyl alcohol, salicyl alcohol, 2-naphthalene ethanol, phenyl-propyl alcohol and cinnamyl alcohol.

Usable aliphatic hydroxyl compounds from which the esters may be derived include monohydric alcohols, di- and higher polyhydric alcohols and ether alcohols, which may be mono-, as well as polyfunctional. Suitable compounds include the following: methanol, ethanol, n-propanol, isopropanol, n-butanol, t-butanol, isoamyl alcohol, n-hexanol, 2-ethylhexanol, n-octanol, isodecanol, capryl alcohol, lauryl alcohol, myristyl alcohol, cetyl alcohol, stearyl alcohol and oxo alcohols, such as tridecyl alcohol, which consists mainly of tetramethyl-1-nonanol and hexadecyl alcohol consisting of a complex mixture of primary alcohols and can be characterized as 2,2-dialkyl ethanols, in which the alkyl groups consist mainly of $C_6$ and $C_8$ radicals with methyl branches.

Esters derived from ether alcohols can also be considered for the preparation of sulfurized products pursuant to the invention. The ether alcohols may be mono- as well as polyfunctional and may contain from 2 to about 8 condensed polyol units. Among others, suitable ether alcohols are diethylene glycol, triethylene glycol, tetraethylene glycol, diethylene glycol monomethyl ether, diethylene glycol monoethyl ether, triethylene glycol monomethyl ether, butoxyethanol, butylene glycol, monobutyl ether, dipentaerythritol, tripentaerythritol, tetrapentaerythritol, diglycerol, triglyerol, tetraglycerol, pentaglycerol, hexaglycerol, heptaglycerol and octaglycerol.

As examples of cycloaliphatic alcohols one can consider cyclohexanol and the alkyl-substituted derivatives thereof.

It has been found that especially attractive products are obtained when one begins with esters derived from a branched, aliphatic alcohol with 2 to 4 primary hydroxyl groups. In this connection, reference may be made to the favorable characteristics obtained through the sulfurizing of esters, the aliphatic polyalcohol of which is neopentyl glycol. Other products with exceptionally good characteristics are obtained when one begins with the esters of trimethylol ethane or dipentaerythritol. In connection with the high thermal stability, preference is given to the sulfurizing of esters derived from the aliphatic polyalcohols trimethylol propane and pentaerythritol. In this connection it can be mentioned that esterification does not have to be complete. It has been found that a high hydroxy number leads to products with excellent dispersing effect. The rheological characteristics of such a product are also very favorable.

On occasion, preference is given to compounds with a relatively high sulfur content of, e.g. 5 to 20%, by weight. As is generally the case, it is here also desirable that the free sulfur content be as low as possible. For such a purpose another compound with ethylenically unsaturated groups may be incorporated in the reaction mixture. This may be a compound such as oleic acid, as in U.S. Pat. No. 2,855,366, discussed above. One may also begin with an ester prepared from an acid that was in turn prepared pursuant to the process of the present invention, and with an alcohol having one or more ethylenically unsaturated groups.

It has been found that good results are obtained when use is made of allyl alcohol as the ethylenically unsaturated alcohol. The esters to be considered in the application of the process pursuant to the present invention are prepared by esterification of an alcohol, or mixture of alcohols, in any manner known in the art, with one or several acids prepared pursuant to the process indicated above. In addition, other branched or unbranched acids may be present. The esterification reaction may be carried out in any customary manner. Thus, the reaction mixture may be heated to a temperature from 100° to 300° C., in the presence or absence of a catalyst, whereby the water released during the reaction is removed. Usually, esterification is carried out between about 140° and about 280° C.

If desired, one may use an esterification catalyst. It may be an acid such as sulfuric or phosphoric acid, an alkylene arylsulfonic acid such a p-toluene sulfonic acid and methane sulfonic acid, and a variety of metal compounds, such as dibutyl tin oxide, tetrabutyl titanate, zinc acetate, stanno-oxalate, iron oxide, ferristearate, manganostearate, cobalt-II stearate and manganoacetate. Normally, the quantity of catalyst is about 0.1 to about 1%, by weight, referred to the reaction mixture. If desired, a diluent forming an azeotrope with water can be used, such as benzene, toluene or xylene.

Usually, one begins with stoichiometric quantities of acid and alcohol, although in case of esterification with the more volatile alcohols, one may also use an excess thereof. Towards the end of the reaction, the excess may be removed from the reaction mixture by means of distillation. Esterification may be carried out under atmospheric pressure, as well as under a reduced pressure (2–50 mm Hg). Under such conditions, excess alcohol and water can easily be removed after completion of the reaction. Usually, the esters obtained in such a manner are ready for sulfurizing after they have, or have not been, mixed with an ethylenically unsaturated compound. On occasion, it may, however, be advisable to apply an additional purification step, e.g. by bleaching with fuller's earth, ozone, peroxide, hypochlorite or another suitable bleaching agent. One may also apply a treatment with activated carbon. Esters derived from aliphatic monoalcohols with 1 to about 8 carbon atoms and a monocarboxylic acid prepared from an alpha-olefin with about 6 to about 12 carbon atoms can e.g. be purified by means of distillation.

Depending upon the intended application, one skilled in the art will in general have no difficulties in choosing parameters that will guarantee as good a result as possible. Due to the availability of a very great number of options, one skilled in the art will mostly be guided by the availability of certain raw materials and will determine the final processing conditions on the basis thereof.

Amides derived from acids prepared in the manner indicated above are also especially suited for sulfurizing to useful additives for lubricant compositions. Preparation of the amides may either take the form of direct reaction of the acid with the amine, or the acid may first be reacted to the acid chloride with, e.g., thionyl chloride or phosphorus tri- or pentachloride, after which the acid chloride may be added to the amine in the presence of a base such as an aqueous sodium hydroxide solution, or pyridine.

Another attractive method of preparing the amides of the acids prepared in the indicated manner is characterized by a direct reaction of the acid, or mixture of acids, and the equivalent quantity of a compound containing one or more isocyanate groups, or mixtures thereof. The use of compounds containing isocyanate groups instead of amino groups has the additional advantage that the reaction proceeds more rapidly, while only carbon dioxide, which can easily be removed, is formed as by-product. The isocyanates to be used in the preparation of the amides may have an aliphatic, as well as an aromatic nature. If products with little or no color are required, preference is given to aliphatic isocyanates. Preference is furthermore given to isocyanates with the general formula A—$R_1$—NCO, wherein $R_1$ represents a (cyclo)aliphatic hydrocarbon with at least 6 carbon atoms, a phenyl or naphthyl group, which groups may, or may not be substituted with one or more lower alkyl groups having 1 to about 8, preferably 1 to about 6 carbon atoms, lower alkoxy groups having 1 to about 8, preferably 1 to about 6 carbon atoms, aryl, e.g. phenyl, and halogen, such as chlorine or bromine, while A represents an —NCO, or —$R_2$—($CH_2$-$R_3$—NCO)$_n$—$R_4$—NCO group, wherein $R_2$ is a simple bond or an aliphatic hydrocarbon group with 1 to about 4 carbon atoms, n is 0 or more, and $R_3$ and $R_4$ may, independently of each other and of $R_1$, have the same meaning as $R_1$.

Examples of suitable monoisocyanates are ethyl isocyanate, hexyl isocyanate, 2-ethylhexyl isocyanate, and butylene stearyl isocyanate. Among others, examples of diisocyanates that can be represented by the formula OCNRNCO, wherein R is a divalent, aliphatic, cycloaliphatic or aromatic group are: hexamethylene diisocyanate, dimethylhexamethylene diisocyanate, trimethylhexamethylene diisocyanate, metaxylylene diisocyanate, paraxylylene diisocyanate, and tetramethylene diisocyanate.

In case R represents an aromatic group, it may e.g. be substituted with a halogen, a lower alkyl, or a lower alkoxy group. Examples of such diisocyanates are: 1-chloro-2,4-phenylene diisocyanate, 2,4-toluene diisocyanate, a mixture of 2,4-toluene and 2,6-toluene diisocyanate, tetramethylphenylene diisocyanate, diphenylmethane-4,4'-diisocyanate, metaphenylene diisocyanate, paraphenylene diisocyanate, napnthalene-1,5-diisocyanate, diphenyl-4,4'-diisocyanate, diphenylmethane-4,4'-diisocyanate, 4,4'-isopropylidenediphenylisocyanate, benzophenone-4,4'-diisocyanate, diphenyl ether, or diphenyl sulfide diisocyanate, 3,3'-dimethyldiphenyl-4,4'-diisocyanate, 3,3'-dimethoxydiphenyl-4,4'-diisocyanate, 3,3'-dichlorodiphenyl- 4,4'-diisocyanate, and benzofuran-2,7-diisocyanate.

Among others, examples of diisocyanates with a cycloaliphatic group are: isophorone diisocyanate, dicyclohexylmethane diisocyanate, and 1,4-cyclohexane diisocyanate.

In addition to the preparation of amides, polyisocyanates can also be used for the preparation of compounds that are difficult to synthesize by direct reaction with the acid. In that instance, one may start out with a stoichiometric shortage of acid or alcohol, so that at least one free isocyanate group per polyisocyanate molecule remains. Such a reaction may then be used in order to bring about a bond with e.g. an alcohol that is difficult to esterify directly on the acid. As an example of such an alcohol one may consider allyl alcohol which, at the high temperature required for esterification, shows a tendency to polymerize.

The temperature at which the reaction between the monocarboxylic acid and the isocyanate takes place depends upon the reactivity of the components participating in the reaction. In general, it will be between about 40° and about 250° C. The progress of the reaction may be traced by means of the quantity of carbon dioxide liberated during the reaction.

The present invention will now be further illustrated by the following non-limiting examples.

EXAMPLE I

A slurry of 17.4 g of manganese-III acetate in 100 ml of acetic anhydride and 84 g (0.6 mol) of 1-decene was slowly added, with good stirring, and under a nitrogen atmosphere, to a mixture of 900 ml (9.5 mol) of acetic anhydride and 42 g. (0.3 mol) of 1-decene over a period from 1.5 to 5 hours. The temperature during the reaction was 125° C. and the stirring velocity 800 rpm. After termination of the reaction, the mixture was cooled to room temperature and filtered in order to remove any formed manganese-II acetate.

After that, acetic anhydride, acetic acid that had been formed, and unreacted 1-decene were distilled off. 200 ml of acetic acid and 25 ml of water were added to the residue, which was followed by heating to 100° C. for 1 hour with good stirring. A mixture of carboxylic acids of the following composition was obtained after distillation of the acetic-water mixture:

|   | % by weight |
|---|---|
| $R_1$ | 32.1 |
| $R_2$ | 21.2 |
| $R_3$ | 21.9 |
| $R_4$ | 14.4 |
| $R_5$ | 10.3 |

Therein, $R_1$ is the addition product of 1 mol 1-decene to 1 mole of acetic acid, $R_2$ the addition product of 2 mols decene to 1 mol acetic acid, $R_3$ the addition product of 3 mols of decene to 1 mol acetic acid, and so on. The acid number of this mixture of carboxylic acids was 169. In the following discussion, this mixture of straight and branched monocarboxylic acids is indicated by $TP_{10}$. By means of distillation in a film evaporator of the type Leybold KDL-4, the $R_1$ fraction (=lauric acid) was removed. The following conditions were maintained thereby:

| temperature of jacket | 118° C. |
|---|---|
| cold finger | 25° C. |
| metering vessel | 40° C. |
| pressure | $10^{-3}$ mm Hg |
| metering rate | 400 ml/hr |

After distillation, the composition of telomeric acids was as follows:

|   | % by weight |
|---|---|
| $R_1$ | 4 |
| $R_2$ | 23 |
| $R_3$ | 32 |
| $R_4$ | 21 |
| $R_5$ | 19 |

The acid number of this telomeric mixture of acids was 104. In the following, this mixture of mainly branched monocarboxylic acids is indicated by HTA 10. Beginning with 1-dodecene, an HTA 12 was prepared in an analogous manner, which had the following product composition:

|   | % by weight |
|---|---|
| $R_2$ | 31.0 |
| $R_3$ | 32.3 |
| $R_4$ | 19.9 |
| $R_5$ | 11.5 |
| $R_6$ | 5.4 |

Finally, beginning with 1-hexene, an HTA-6 was prepared, which had the following product composition:

|   | % by weight |
|---|---|
| $R_1$ | 1.2 |
| $R_2$ | 19 |
| $R_3$ | 27 |
| $R_4$ | 19 |
| $R_5$ | 11 |
| $R_6$ | 19 |

The acid number of that mixture of monocarboxylic acids was 160.

EXAMPLE II

In every case, 50 g of a mixture of monocarboxylic acids prepared according to Example I on the basis of 1-hexene (HTA-6) were heated to 180° C. for about 2.5 hours with 0.8, 1.6, or 2.4 g of sulfur. During the reaction, a weak stream of nitrogen was conducted through the solution. After cooling to about 80° C., a vacuum was applied for 1 hour at this temperature in order to remove volatile sulfur compounds as much as possible.

The sulfur content was determined after termination of the reaction. In the sequence of the sulfur addition indicated above, the percentage by weight of sulfur taken up was 1.5, 2.4 and 2.5, respectively. Of the sulfurized products obtained in this manner, a 3 and a 10% by weight solution was made in the basic liquid of a commercially available lubricating oil. The viscosity at different temperatures (according to ASTM D97-66) is shown in Table I:

TABLE I

|   | Sulfurized HTA-6 | | | |
|---|---|---|---|---|
|   | 3% by weight viscosity in $mm^2$/sec. at | | 10% by weight viscosity in $mm^2$/sec. at | |
| Sulfurized HTA-6 % by weight of S | 40° C. | 100° C. | 40° C. | 100° C. |
| 1.5 | 31.9 | 5.36 | 33.2 | 5.47 |
| 2.4 | 31.9 | 5.37 | 33.5 | 5.54 |
| Viscosity of the basic oil at 40° C.: 31.4 $mm^2$/sec. | | | | |
| at 100° C.: 5.41 $mm^2$/sec. | | | | |

Table I shows clearly, that an increase in sulfur content has no, or hardly any, influence on the viscosity of the oil.

EXAMPLE III 50 g of a mixture of monocarboxylic acids prepared according to Example I on the basis of 1-decene (HTA-10) were heated to 180° C. for about 2.5 hours with 1.9 g of sulfur. During the reaction, a weak stream of nitrogen was conducted through the solution. After cooling to about 80° C., a vacuum was applied for 1 hour at this temperature, in order to remove volatile sulfur compounds as much as possible. The sulfur content of the mixture obtained in this way was 2.9% by weight. For comparison purposes, a corresponding experiment was performed, in which the reaction with sulfur (5 hours, 195° C.) was followed by cooling to 150° C. and blowing through of air for 14 hours at this temperature.

The sulfur content of the mixture obtained in this manner was 3.3% by weight.

A 3 to 10% by weight solution of the sulfurized products obtained in this manner was made in the basic liquid of a commercially available lubricating oil. The viscosity at different temperatures, measured according to ASTM D97-66 is shown in Table II:

TABLE II

|   | Viscosities in $mm^2$/sec. of sulfurized HTA-10 in mineral oil | | | |
|---|---|---|---|---|
| Sulfurized HTA-10 | 3% by weight | | 10% by weight | |
| % by weight of S | 40° C. | 100° C. | 40° C. | 100° C. |
| 2.9 | 32.2 | 5.43 | 34.5 | 5.75 |
| 3.3 | 32.5 | 5.38 | 34.8 | 5.75 |
| Viscosity of the basic oil at 40° C.: 31.4 $mm^2$/sec. | | | | |
| at 100° C.: 5.41 $mm^2$/sec. | | | | |

EXAMPLE IV

This example relates to the preparation and characteristics of a number of sulfurized telomeric esters.

a. 50 g of a mixture of monocarboxylic acids based on telomerized 1-dodecene (HTA-12), acid number 109.1, prepared in keeping with Example I, 75 g of butanol, and 1 g of manganese-II acetate were heated in an autoclave for 240 minutes at 280° C. with good stirring. The mixture formed in this manner was cooled to room temperature and the excess of n-butanol removed by distillation. The resulting product was taken up in ether and washed with water in order to remove manganese-II acetate. The product taken up in ether was dried over a drying agent ($MgSO_4$) and the ether distilled off.

50 g. of the butyl ester of HTA-12 obtained in this manner was heated with 1.9 g of sulfur to 180° C. for about 2.5 hours and treated further according to the procedure described in Example II. The percentage by weight of sulfur taken up was 2.4.

b. 100 g of a mixture of monocarboxylic acids derived by telomerizing a mixture of $C_{20}$-$C_{24}$ alpha-olefins, acid number 138.5, was heated with 50 g of allyl alcohol for 20 hours under nitrogen in a Soxhlet filled with molecular screen No. 4, and with reflux cooling. Subsequently, the excess allyl alcohol was removed by distillation under reduced pressure.

50 g of the allyl ester obtained in this manner were treated with 20 g of sulfur according to the procedure described in Example II. The percentage by weight of sulfur taken up amounted to 17.7.

The telomeric distribution of the mixture of $C_{22}$-$C_{26}$ monocarboxilic acids differed from the mixture obtained according to Example I and is shown as follows:

|   | % by weight |
|---|---|
| $R_1$ | 78 |
| $R_2$ | 6.3 |
| $R_3$ | 6.5 |
| $R_4$ | 4.0 |
| $R_5$ | 3.1 |
| $R_{\geq 6}$ | 2.0 |

This distribution was obtained by starting out with only 5% of the olefin at the beginning of the reaction. The remainder of the olefin and 0.055 mol manganese-III acetate in 160 mol acetic anhydride were added within 3.5 hours at 120° C.

c. The partial allyl ester of HTA was synthesized in an analogous manner as in the above example b.

50 g of this ester were treated with 20 g of sulfur according to the procedure described in Example II. The percentage by weight of sulfur taken up was 6.5. Solutions of 3 and of 10% by weight of the sulfurized products obtained in this manner were made in the basic liquid of a commercially available lubricating oil. The viscosities at different temperatures, measured according to ASTM D97-66 are shown in Table III:

TABLE III

| Sulfurized HTA-10 | Viscosities in $mm^2$/sec. of the sulfurized telomeric esters in mineral oil | | | |
|---|---|---|---|---|
|  | 3% by weight | | 10% by weight | |
| % by weight of S | 40° C. | 100° C. | 40° C. | 100° C. |
| 2.4 | 31.2 | 5.32 | 30.3 | 5.33 |
| 17.7 | 32.6 | 5.45 | 35.7 | 5.86 |
| 6.5 | 31.7 | 5.37 | 31.5 | 5.40 |

TABLE III-continued

| Sulfurized HTA-10 | Viscosities in $mm^2$/sec. of the sulfurized telomeric esters in mineral oil | | | |
|---|---|---|---|---|
|  | 3% by weight | | 10% by weight | |
| % by weight of S | 40° C. | 100° C. | 40° C. | 100° C. |
| Viscosity of the basic oil at 40° C.: 31.4 $mm^2$/sec. at 100° C.: 5.41 $mm^2$/sec. | | | | |

EXAMPLE V

This example shows the preparation and characteristics of a number of sulfurized telomeric amides.

a. 50 g of a mixture of monocarboxylic acids based on telomerized 1-decene (HTA-10), acid number 104, prepared according to Example I, and 11.8 g of hexyl isocyanate were stirred for 30 minutes at room temperature in a three-necked flask under nitrogen. Within 1 hour, the temperature was raised from 20° C. to 50° C., then increased to 140° C. over a period of 1 hour, after which it was held at 140° C. for another hour.

b. 102.3 g of a mixture of monocarboxylic acids based on telomerized 1-decene (TP-10), acid number 169, prepared according to Example I, and 24.9 g of toluene diisocyanate were stirred for 30 minutes at room temperature in a three-necked flask under nitrogen. After that, the temperature was raised to 100° C. in 150 minutes and held for 14 hours at that level. Subsequently, the mixture was heated to 150° C. for 120 minutes.

50 g of the mixture obtained in this manner were sulfurized with 1.9 g of sulfur according to the procedure described in Example II. The percentage by weight of sulfur taken up was 3.6.

Solutions in a basic liquid of a commercially available lubricating oil were made of the sulfurized products obtained in these ways. The viscosities at different temperatures, measured according to ASTM D97-66 are shown in Table IV:

TABLE IV

| Sulfurized amide | Viscosities in $mm^2$/sec. of the sulfurized telomeric amides in mineral oil | | | |
|---|---|---|---|---|
|  | 3% by weight | | 10% by weight | |
| % by weight of S | 40° C. | 100° C. | 40° C. | 100° C. |
| 2.6 | 31.8 | 5.38 | 35.0 | 5.60 |
| 3.6 | 41.1 | 5.72 | — | — |
| Viscosity of the basic oil at 40° C.: 31.4 $mm^2$/sec. at 100° C.: 5.41 $mm^2$/sec. | | | | |

What is claimed is:

1. In a process for preparing a sulfur-containing composition useful as a lubricant additive wherein an organic carboxylic acid is sulfurized in the form of the acid or an ester or amide derivative thereof, the improvement comprising using as the acid or acid portion of an ester or amide derivative, a carboxylic acid or mixture thereof obtained by telomerizing an ethylenically unsaturated compound under inert conditions in a reaction medium containing from about $10^{-3}$ to about $10^{-10}$ moles per liter of an at least trivalent manganese compound and one or more carbonyl compounds having at least one hydrogen atom on an alpha-carbon atom wherein at least 60 percent by weight of the total carbonyl-containing compound content is present as carboxylic anhydride and the molar ratio of the reacted quantity of ethylenically unsaturated compounds to the at least trivalent manganese compound is at least 4.

2. The process of claim 1 wherein at least 90 percent of the total carbonyl-containing compound content is present as acetic anhydride, the trivalent manganese compound is at least 90 percent manganic acetate, and the telomerization is performed at a temperature between about 100° and 140° C.

3. The process of claim 1 or 2, wherein the ethylenically unsaturated compound is an alpha-olefin with about 6 to about 26 carbon atoms.

4. The process of claim 1 wherein the organic carboxylic acid is sulfurized in the form of an ester or mixture of esters derived from one or more members of the group consisting of aliphatic alcohols with 1 to about 50 carbon atoms and 1 to about 10 primary or secondary hydroxyl groups, cycloaliphatic alcohols with about 6 to about 20 carbon atoms, and polyalkylene oxide glycols with about 2 to about 50 alkylene units with a ratio of carbon to oxygen of about 2.0 to about 4.3.

5. The process of claim 1 wherein an additional compound with ethylenically unsaturated groups is incorporated in the reaction mixture prior to sulfurization.

6. The process of claim 5, wherein the carboxylic acid is esterified with an alcohol having one or more ethylenically unsaturated groups prior to sulfurization.

7. The process of claim 6, wherein allyl alcohol is used as the alcohol.

8. A lubricant composition containing a major amount of a lubricating oil and a minor amount of one or more sulfur-containing additives prepared according to the process of claim 1, 2, 4, 5, or 6.

* * * * *